(12) United States Patent
Gasnier et al.

(10) Patent No.: US 11,010,447 B1
(45) Date of Patent: May 18, 2021

(54) SYSTEMS, DEVICES, AND METHODS FOR PRESENTING CUSTOMIZED CONTENT THROUGH WEB API

(71) Applicant: Rich Context LLC, Rogers, AR (US)

(72) Inventors: Troy Alfred Gasnier, Rogers, AR (US); Tristan Addam Hardy, Rogers, AR (US)

(73) Assignee: Rich Context LLC, Rogers, AR (US)

( * ) Notice: Subject to any disclaimer, the term of this patent is extended or adjusted under 35 U.S.C. 154(b) by 0 days.

(21) Appl. No.: 16/795,078

(22) Filed: Feb. 19, 2020

Related U.S. Application Data

(63) Continuation-in-part of application No. 16/006,675, filed on Jun. 12, 2018, now abandoned.

(51) Int. Cl.
| | |
|---|---|
| *G06F 16/958* | (2019.01) |
| *H04L 29/08* | (2006.01) |
| *G06F 16/9537* | (2019.01) |
| *G06F 9/54* | (2006.01) |
| *G06F 16/95* | (2019.01) |

(52) U.S. Cl.
CPC ............ *G06F 16/958* (2019.01); *G06F 9/54* (2013.01); *G06F 16/95* (2019.01); *G06F 16/9537* (2019.01); *H04L 67/02* (2013.01); *H04L 67/18* (2013.01)

(58) Field of Classification Search
CPC .......... H04L 67/18; H04L 67/02; H04W 4/02; G06Q 30/0261; G06F 16/909; G06F 16/95; G06F 16/9537; G06F 16/958
See application file for complete search history.

(56) References Cited

U.S. PATENT DOCUMENTS

| | | | | |
|---|---|---|---|---|
| 8,150,979 B1 * | 4/2012 | Oldham | ............... | G06F 16/9566 709/228 |
| 8,577,732 B1 * | 11/2013 | Martin | ..................... | H04L 67/06 705/26.1 |
| 2005/0204276 A1 * | 9/2005 | Hosea | ................... | H04L 67/306 715/205 |
| 2008/0244046 A1 * | 10/2008 | Campbell | ............... | H04L 67/20 709/222 |
| 2010/0057830 A1 * | 3/2010 | Takala | ..................... | H04L 67/20 709/203 |
| 2012/0252494 A1 * | 10/2012 | Parker | ................... | H04W 4/029 455/456.3 |

(Continued)

*Primary Examiner* — Jeong S Park
(74) *Attorney, Agent, or Firm* — Wright Lindsey Jennings, LLP; Meredith Lowry

(57) ABSTRACT

The solutions provide a distributed computing architecture and system for HTTP message exchange and modification. An HTTP request for information may be pre-processed by a first server to detect the geographic location information of the requester and add such geographic information into the request. The modified request is further processed by a second server to identify rules associated with each type of geographic location information included in the request and to add such rule information as associated with the geographic location information into the request. The further modified request is then processed by a third server to determine the geographic location information, retrieve the rule information, and map and obtain a content customized for the request based on the geographic location information and the rule information.

20 Claims, 5 Drawing Sheets

(56) References Cited

U.S. PATENT DOCUMENTS

| | | | |
|---|---|---|---|
| 2014/0274145 A1* | 9/2014 | Cronin | H04W 4/021 |
| | | | 455/456.3 |
| 2016/0007162 A1* | 1/2016 | Sugaya | H04W 4/80 |
| | | | 455/456.3 |
| 2017/0169454 A1* | 6/2017 | Gu | G06Q 50/01 |
| 2018/0165061 A1* | 6/2018 | Nicolich-Henkin | |
| | | | H04L 12/282 |
| 2019/0061782 A1* | 2/2019 | Cheaz | G08G 1/096741 |

* cited by examiner

SYSTEMS, DEVICES, AND METHODS FOR PRESENTING CUSTOMIZED CONTENT THROUGH WEB API

CROSS-REFERENCE TO RELATED APPLICATIONS

This application claims priority to and is a continuation-in-part of U.S. application Serial No. U.S. application Ser. No. 16/006,675, filed Jun. 12, 2108, the entirety of which is hereby incorporated by reference.

STATEMENT REGARDING FEDERALLY SPONSORED RESEARCH OR DEVELOPMENT

Not applicable.

BACKGROUND OF THE INVENTION

Technical Field

This disclosure generally relates to internet-based content presentation, and more specifically to customized content presentation.

Description of the Related Art

A Web API is an application programming interface, which generally includes a set of Hypertext Transfer Protocol (HTTP) request and response messages for either a web server or a web browser. An API is exposed to various clients and of various capacities, formats and needs, and may be easily adapted to handle the varieties. The HTTP scheme can thus allow different clients to be severed differently without duplications in system configurations and programming.

BRIEF SUMMARY

Embodiment of the current disclosure provides an interactive communication mechanism that enables a highly-efficient customized information exchange based on an information requester's geographic location. This technique utilizes the technical features achieved only through internet-based technologies and implements a response message, e.g., an internet webpage content displayed to the information requester, through a web API that accepts plug-in applications/features of multiple computing systems arranged in a distributed computing architecture.

The requester's geographic location is detected by a platform server which receives the requester's request for webpage content. The geographic location information may be detected using various means, e.g., internet protocol (IP) address, global positioning system (GPS), historical geographic location data, etc., and may include multiple types, e.g., current location, residency/home location, past residency/hometown location, etc. The requested webpage content/information may not be owned by the platform server and may be owned by a third-party information publisher. Therefore, the platform server may coordinate with the third-party information publisher in fulfilling the request of the requester.

As the geographic location data of the requesters is important data and has commercial value or may be private data, the platform server may not be willing to share the information with others. Namely, the platform server may be willing to provide only marginally sufficient information about the geographic location information of a requester.

In an embodiment, the current technique implements the sharing of the requester's geographic location information through sharing and/or modification of the HTTP request message by the platform server. The data indicative of the geographic location of the requester is added to the original request message either in its header portion or in the content portion, for example. The geographic location data may directly reflect the geographic location or may be an identifier identifying a resource where such information can be accessed. In the case that the IP address of the requester computing device is used alone to determine the geographic location of the requester, the HTTP request does not need to be modified because the IP address is included in the HTTP request based on the protocol provisions.

In at least some implementations, the request is received by the publisher server. The publisher server may further modify the request by adding rule information into the request. The rule information indicates rules that stipulate how the geographic location information is used to select the customized content (e.g., images) to be provided to the requester. The rule information may be added into the header or into the content portion of the request. The rule information may directly reflect the rule or may be an identifier, like an URL/URI indicating a resource where the rule is accessible. In an embodiment, the rule information is added as associated to each type of geographical location information. The rule information may also include a mega rule, which provides a priority of applying the various rules related to various types of geographic location information. Each rule may include a geographic classification database where geographic classes are associated with identifications of contents.

The further modified request is received by a content provider. The content provider determines the geographic location of the requester and retrieves the related rules, based on the modified request. The determined geographic location is then mapped into the respective classification database which associates classes of geographic locations with corresponding contents. If the mapping successfully identifies a corresponding content, the corresponding content will be provided to the requester through the web API, e.g., by generating the webpage showing the content to the requester. If no mapping is found, a default content is provided to the requester.

In another example, the rule information is exchanged between the publisher and the content provider in an asynchronous manner and the content provider received the rule information and/or rule engine as pre-set and maps the geographic location information with the rule to determine the customized content for the requester. As described herein, the geographic location information may be added to the HTTP request by the platform or may be originally contained in the HTTP request, e.g., IP address of the requester.

By using web APIs in presenting the webpage to the requester, the disclosed techniques achieve that customized contents be provided to different requesters without unnecessary duplicated programming for each requester and/or for each content, and a same webpage address, e.g., URL, having generic or standard user content may be used to present the different contents to different requesters (e.g., based on the requesters' geographic locations). The complexity of managing the multiple servers that support the webpages are substantially reduced.

Further, in the process of providing customized contents, the client request is modified in a distributed computing architecture such that the processing load on the content provider is substantially reduced, which also improves response speed. Specifically, the geographic location data and the rule data are obtained and inserted into the request through different servers of the platform and the publisher in, namely, pre-processed, and the content provider can easily retrieve and process such pre-processed geographic location data and rule data in selecting the corresponding content in, namely, final processing. Such distributed computing architecture, and the allocation of the computing loads among the pre-processing and final processing, are advantageous, especially in the nowadays common scenarios that a platform functions with multiple publishers, a publisher functions with multiple platforms, and a content provider functions with multiple platforms and publishers.

The data indicative of geographic location of a requester and the data indicative of rules, e.g., URL/URI directing to a resource of rules, associated with each type of geographic location are added into the HTTP request message, either in the header portion or the content portion. Such modification of the HTTP messages take advantages of the existing channels of message exchange and reduces the computing complexity in processing the additional geographic location information and the additional rule information. Therefore, the operation of the computer system itself is streamlined and improved.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
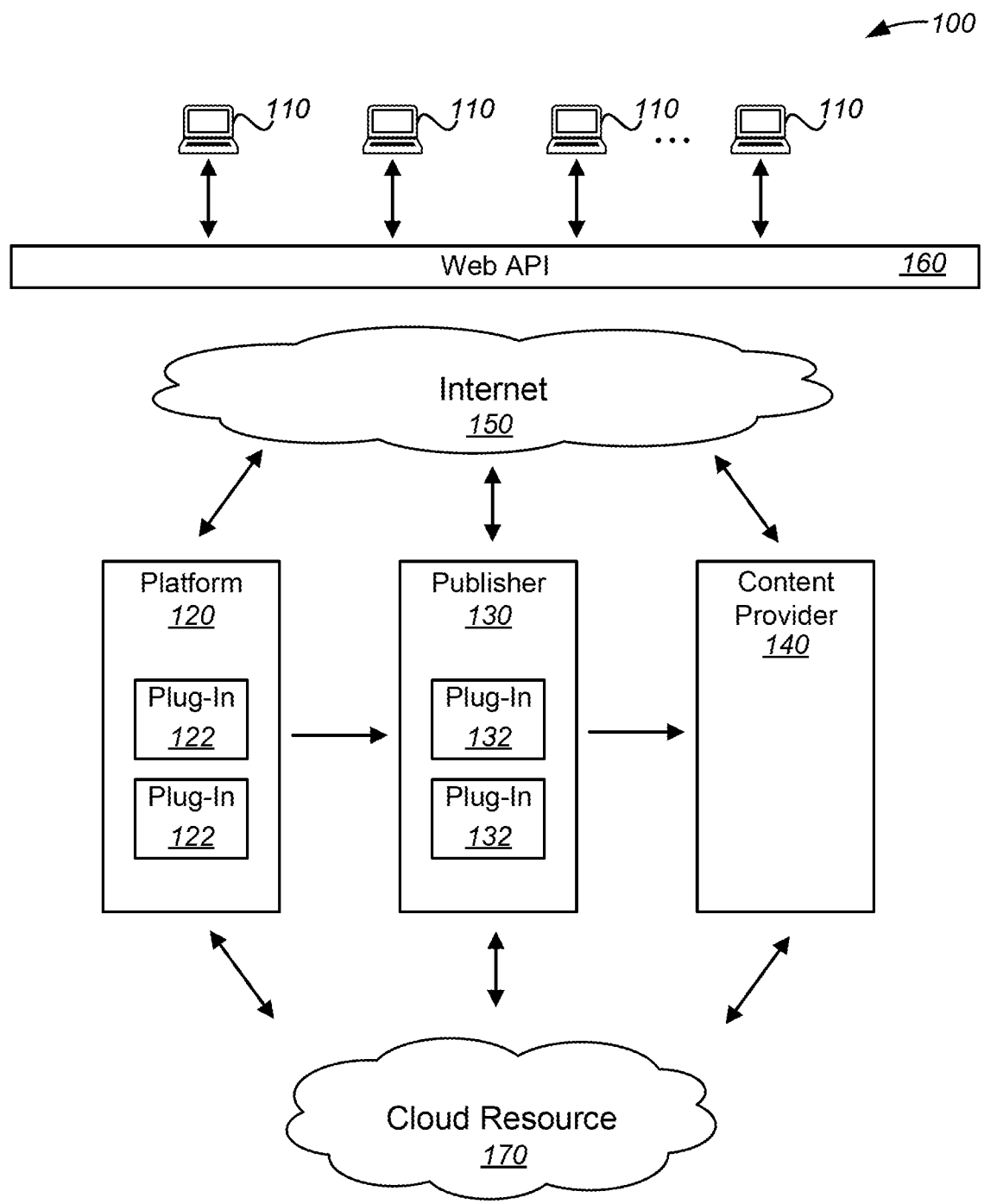
FIG. 1 is an environmental diagram of a distributed computing system, according to one illustrated implementation.

FIG. 1 shows a networked environment 100 of a distributed computing system, in which systems, devices articles and methods for providing users with customized contents through a single URL may be performed or implemented, according to an illustrated implementation. The networked environment 100 includes an arrangement of components, with various data flows therebetween.

The networked environment 100 may include one or more client computing devices ("clients") 110, one or more web content platform server computers ("platform") 120, which may each have one or more plug-ins 122, one or more content publisher server computers ("publisher") 130, which may each have one or more plug-ins 132, and one or more content provider server computers ("content provider") 140. One or more of the clients 110, platforms 120, publishers 130 and content providers 140 may communicate with one another via the network 150, e.g., internet or any other suitable computer/telecommunications networks that enable data communication among the various devices shown in FIG. 1.

In an embodiment, a client 110 may transmit requests to the platform 120, requesting information. The platform 120 responds to the request by providing information, e.g., in the form of webpages ("platform webpage"), which are commonly encoded in a markup language file (e.g., HTML, XML). The provided information may include data, meta-data (e.g., cookies) and/or executable code or scripts (e.g., JavaScript scripts). The request and the response may be implemented through message exchange under the Hypertext Transfer Protocol (HTTP).

With arrangements between the publisher 130 and the platform 120, and with the suitable plug-in application(s) 122 added to the platform 120, a content or a URL link to a content published by the publisher 130 may be included in the response of the platform to the client. For example, a webpage response by the platform 120 to a client request may include a link to a landing page of an advertisement content published and provided by the publisher 130.

With arrangements between the publisher 130 and the content provider 140, and with the suitable plug-in application(s) 132 added to the publisher 130, the content provider 140 may insert contents (e.g., images) to one or more of the platform webpage (response of the platform 120 to the client 110 request) or the landing webpage (a response of the publisher 130 to the client 110 request).

One or more of the platform webpage or the landing webpage may be linked to and supported by respective web APIs 160, e.g., a REST web API. The web APIs 160 enable the contents of the platform webpage and/or the landing webpage to be customizable for each individual client 110 without duplications in system configurations and programming.

The platform 120, publisher 130 and the content provider 140 may have access to, with various restrictions and/or authentication schemes, one or more cloud-based 15 resources 170.

It should be appreciated that the platform 120, publisher 130 and content provider 140 may be differentiated only based on their relative roles in providing an HTTP response to an HTTP request of a client 110. Namely, in at least some implementations, the client 110 request is initially sent to the platform 120 and processed and routed to the publisher 130, and then processed and routed to content provider 140. The functions of the platform 120, publisher 130, and content provider 140 may be implemented within a single server computer or may be implemented by multiple server computers of one or more entities. The differentiations among the platform 120, publisher 130, and content provider 140 are for descriptive purposes only, and do not limit the scope of the disclosure. For example, the platform 120, publisher 130, and content provider 140 may be different components of a single application, and may communicate within the operation of the single application using HTTP request and response messages.

In an example scenario, which is used herein for illustration purposes only, the platform 120 may include plug-in applications 122 of multiple publishers 130, and each publisher 130 may engage one or more content providers 140 in providing contents to a platform webpage of the platform 120 and/or a landing webpage of the publisher 130. The multiple publishers 130 may each have different content types and formats for the contents they publish through the platform 120, and the multiple content providers may each include different formats for the contents they provide to the platform webpage and/or the landing webpage that are associated with the provided contents. Such multitude in content format/types is easily enabled through the web APIs 160, which is implemented through, for example, a RESTful system. In the description herein, a landing webpage linked to a web API supported by a publisher 130 is used as an illustrative example to describe the disclosed techniques of providing customized content to a client 110 based on a geographic location of the client 110, which does not limit the scope of the disclosure.

While various implementations are described in terms of the networked environment illustrated in FIG. 1, those skilled in the art will appreciate that implementations may be implemented in a variety of other environments or forms, including various other combinations of computer systems or similar processor-based devices communicatively coupled in various ways. For instance, wired and wireless enterprise-wide computer networks, intranets, extranets, and/or the Internet may be included in or comprise a part of a networked environment. Implementations may include various types of communication networks including other telecommunications networks, cellular networks, paging networks, and other mobile networks. There may be any variety of computers, switching devices, routers, bridges, firewalls, edge devices, multiplexers, phone lines, cables, telecommunications equipment and other devices within the Internet 150 or a suitable computer/telecommunications network. There are a variety of systems, components, network configurations that may also support the networked environment 100.

Any such infrastructures may be used in conjunction with, be connected to, or comprise part of the networked environment 100.

Although not required, the implementations will be described in the general context of computer-executable instructions, such as program application modules, objects, or macros stored on computer- or processor-readable storage media and executed by a computer or processor. Those skilled in the relevant art will appreciate that the illustrated implementations as well as other implementations can be practiced with other system configurations and/or other computing system configurations, including hand-held devices, multiprocessor systems, microprocessor-based or programmable consumer electronics, personal computers (PCs), network PCs, mini computers, mainframe computers, and the like. The implementations can be practiced in distributed computing environments where tasks or modules are performed by remote processing devices, which are linked through a communications network 150 such as the Internet. In a distributed computing environment, program modules may be located in both local and remote memory storage devices.

Although the physical networked environment 100 may have connected devices such as computers, the physical environment may alternatively have or be described as comprising various digital or processor-based devices such as smart phones, personal digital assistants (PDAs), televisions, MP3 players, etc.

Figure 2:
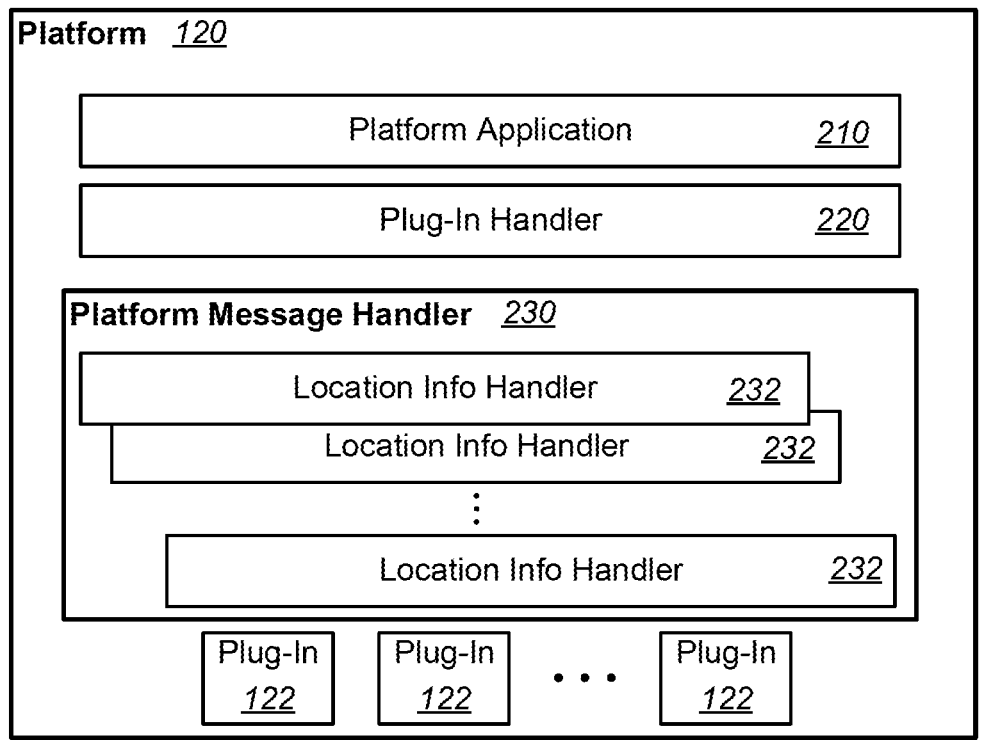
FIG. 2 is a schematic diagram of a platform server, according to one illustrated implementation.

FIG. 2 shows an example structure of the platform 120 of FIG. 1. Referring to FIG. 2, the platform 120 includes a platform application 210, a platform plug-in handler 220 and a platform message handler 230. Platform application 210 implements a platform webpage based on a client 110 request. For example, a header portion of the client 110 request may include a URI indicating a suitable type of webpage to be displayed, e.g., a webpage for a mobile application or a webpage for a desktop application. A header portion of the client 110 request may also indicate a list of MIME media suitable for the client 110.

The platform application 210 functions with the platform message handler 230 in detecting geographic location information of the client 110 that sends the request.

The geographic location information may be an internet protocol (IP) address of the client 110, GPS information, mobile signal strength information, a historical geographic location data of the client 110, etc.

The platform application 210 detects an interactive response of the client 110 on a presented webpage. For example, the platform application 210 detects whether the client 110 activates a link provided in the platform webpage or whether a client operates on a provided content, e.g., enlarging a presented image.

The platform plug-in handler 220 identifies a suitable plug-in application 122 of the publisher 130 to be executed with the platform webpage. For example, the platform plug-in handler 220 may determine whether a relevant published content is inserted into the platform webpage, or a link to a landing page of the published content is inserted in the platform webpage.

The platform message handler 230 processes the received client 110 request ("original request") and generates a modified request ("platform request") to be sent to the relevant publisher 130. Specifically, the platform message handler 230 includes a plurality of location information handlers 232. Each location information handler 232 may check whether there is a specific type of geographic location information associated with the client 110. There may be multiple types of geographic locations associated with a client 110, including, but not limited to, current residency, current geographic location, etc. or historical geographic location data, including, but not limited to, past residency, hometown, locations of colleges, etc. For each of the classified geographic locations, platform message handler 232 may include a respective location information handler 232. If any of the geographic location information is found available with the client 110 for the relevant request, the respective location information handler 232 modifies the original request by inserting the respective geographic location information.

Note that the geographic location information may not directly reflect the geographic location and may be an identifier, e.g., URL//URI.

Further, in the case that the IP address of the client 110 is the only data used to indicate the geographic location of the client 110, the IP address of the client 110 is originally contained in the original HTTP request and the platform message handler 230 does not process the HTTP message to add data indicative of geographic location(s) of the client 110. By sharing/passing through the original request, the content provider 140 may determine the geographic location of the client 110 based on the IP address as originally contained in the HTTP request.

The insertion of the geographic information may be implemented in various approaches, and all are included in the disclosure. For example, a URI/URL in the header section of the request message may be used to indicate a piece of geographic location information associated with the client 110 of the current request. The URI/URL may direct to a geographic location information database stored in the cloud resource 170, for example. A dedicated component may also be added into the content of the original HTTP request to reflect the geographic location information.

In an embodiment, platform plug-in handler 220 and platform message handler 230 may coordinate in selecting the types of geographic location information relevant to the type of plug-in application executed within the platform webpage. For example, a platform webpage of travel advisers may dictate that only a current geographic location of a client 110 is relevant, and, based on the URI in the original client 110 request, platform message handler 230 may select only the location information handler 232 for the current geographical location to process the client 110 request.

In another embodiment, platform message handler 230 may add all available geographic location information of the client 110 into the modified request for the publisher 130 and/or the content provider 140 to select the pertinent geographic location information.

Various approaches may be used by location information handlers 232 to determine the geographic location information of the client 110. For example, an internet protocol ("IP") address of the client 110 computer, GPS information of a mobile device, mobile signal strength-based positioning information, historical geographic location data, other public and/or proprietary data related to the client 110 can each and all be used to determine the various types of geographic location information. Further, the different channels of location information may also be correlated to determine a type of geographic location information. For example, a client 110 may set up a virtual IP address linking multiple user devices together. In this case, an IP address (virtual IP address) of a laptop 110 may not accurately represent the current geographic location of the laptop 110, but a GPS information of the related mobile device (of the same virtual IP address) may be used to imply the current geographic location of the laptop 110.

The geographic location of a client 110 may be determined in an asynchronous manner with respect to the current client 110 request. For example, the geographic location may be determined in a previous request handling, and saved in a database. For different location information handlers 232, different thresholds may be set to maintain the saved location information or to label the saved location information as "current." For example, a location information handler 232 for the current geographic location of a client 110 may treat a current city level geographic information determined within one hour as current, and may treat a current state level geographic information determined within half day as current. The asynchronous determination of the geographic location of the client 110 may be conducted through a cloud-based geocoding function/service, or may be conducted by the platform 120 locally, and retrieved by location information handlers 232.

Further, location information handlers 232 may process the client 110 request and insert the relevant data indicative of the geographic locations of the client 110 for the publisher 130 and/or the content provider 140 to obtain the geographic location of the client 110 using their own procedures and routines.

Through the processing of the original request with the inserted data indicative of geographic location information, a modified request or platform request is generated and transmitted to the publisher 130 and/or the content provider 140.

Figure 3:
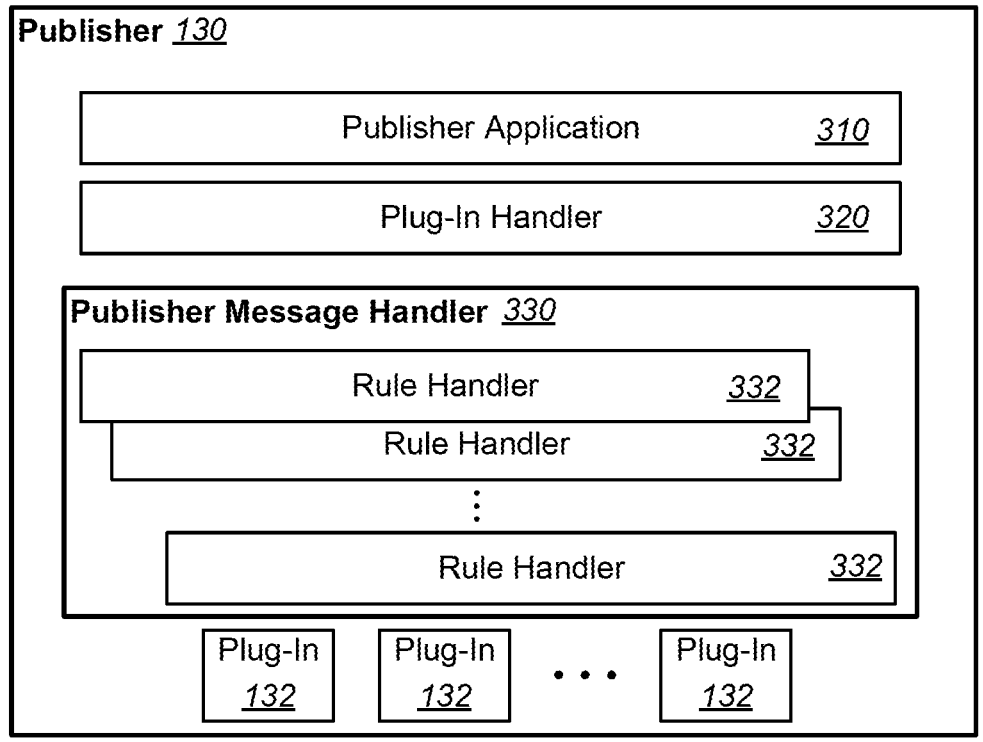
FIG. 3 is a schematic diagram of a publisher server, according to one illustrated implementation.

FIG. 3 shows an example structure of the publisher 130. Referring to FIG. 3, the publisher 130 includes a publisher application 310, a publisher plug-in handler 320 and a publisher message handler 330. Publisher application 310 implements a landing webpage, or inserts a content plug-in in the platform webpage, based on the received platform request. For example, a header portion of the platform request may include an URI indicating a proper plug-in application 122 to be executed by the publisher application 310. The header portion of the platform request may include a suitable webpage to be displayed as the landing webpage, e.g., a webpage for a mobile application or a webpage for a desktop application.

The publisher plug-in handler 320 identifies a suitable plug-in application 132 of the publisher 130 to be executed with the landing webpage or with other plug-in applications 122 of the publisher 130. For example, the publisher plug-in handler 320 may determine a type of multimedia content, e.g., either a still image or video images, to be inserted into the landing webpage.

The publisher message handler 330 processes the received platform request and generates a modified request ("publisher request") to be sent to the relevant content provider 140. Specifically, the publisher message handler 330 includes a plurality of rule handlers 332. Each rule handler 332 may check whether there is a specific type of rule related to a specific type of geographic location information included in the platform request. The rules are associated with the plug-ins 132 executed with respect to the platform 120 request. For example, the rules are each related to how customized content is selected and provided to the client 110 based on the geographic location information of the client 110 in executing the plug-ins 132. Further, the publisher message handler 330 may determine a priority order of the rules, namely a mega rule, related to different types of the geographic location information available for the client 110. For example, for a local restaurant finder related advertisement (landing webpage), the current geographic location of the client 110 may be assigned with the highest priority because it is assumed that the client 110 prefers a restaurant nearby, and then the hometown information may be assigned with some lower priority, which may be used to screen the types of the foods to be presented to the client 110. For example, if a client 110 is determined as currently near the Fisherman's Wharf in San Francisco, Calif., and is from New Orleans, La., rules will provide that a landing page of restaurant recommendations will list, at the top eye-catching positions, southern cuisines within a certain distance about the Fisherman's Wharf.

Alternatively or additionally, the rules or rule engine may be communicated to the content provider 140 in an asynchronous manner and be stored locally with the content provider 140 for local retrieval or access. And the publisher message handler 330 may not need to process the HTTP request received from the platform 120.

There may be multiple types of geographic locations associated with a client 110, including but not limited to current residency, current geographic location, and past historical geographic locations, such as but not limited to past residency, hometown, locations of colleges, etc. For each of the geographic locations, a platform message handler may include a respective location information handler 232, and may insert a data indicating the availability of the type of geographic location information. Publisher message handler 330 may have rule handlers 332 that handle some types of the geographic locations, and if such types of geographic location information are available in the platform request, the respective rule handler 332 will insert the rule or data indicative of the rule into the request.

Publisher message handler 330 may also determine that some types of geographic location information (e.g., "pertinent geographic locations") are relevant to, and some are not relevant to, the contents of the landing webpage, or for the plug-in content to be inserted in the platform webpage. As such, even if rules are available for such geographic location information, publisher message handler 330 may choose not to process such geographic location information by rule handlers 332. That is, publisher message handler 330 may select rule handlers 332 in processing the platform 120 request with respect to the pertinent types of geographic locations, and the mega rule may set a priority order of applying the rules associated to the pertinent geographic locations.

In an example, the publisher message handler 330 may delete the geographic location data that is not pertinent.

The selected rule handlers 332 may each process the received platform request, and check whether the respective type of geographic location information (or data indicative of the respective type of geographic location information) is included in the header section or content section of the request. If the respective geographic location information is available, the rule handler 332 may insert the relevant rule information into the request. The rule information may be inserted in various ways, and all are included in the disclosure. For example, a URI/URL directing to a location of the stored rules, in a database or a rule engine, may be added to the header section of the request or to a dedicated segment in the content of the request.

A rule as associated with a type of geographic location may include a geographic classification database. In the database, classes of geographic locations are associated with identifiers of contents. The classification itself is part of the rule and may be dynamically updated. The identifier to the contents may be dynamically updated as well as the contents themselves. It should be appreciated that the contents may be updated on the content provider 140 side and the classification database may also store and/or update the identifiers to the contents. For different type of the plug-in applications 122 executed by the publisher application 310, the rules and the classifications may be different. For example, for a local restaurant recommendation related plug-in 122, the classification may be in the scale of 15 square miles. For another example, for a Super Bowl related plug-in application, the classification is in the scale of multiple states.

The resulting request, namely a publisher request, is sent to the relevant content provider 140.

Figure 4:
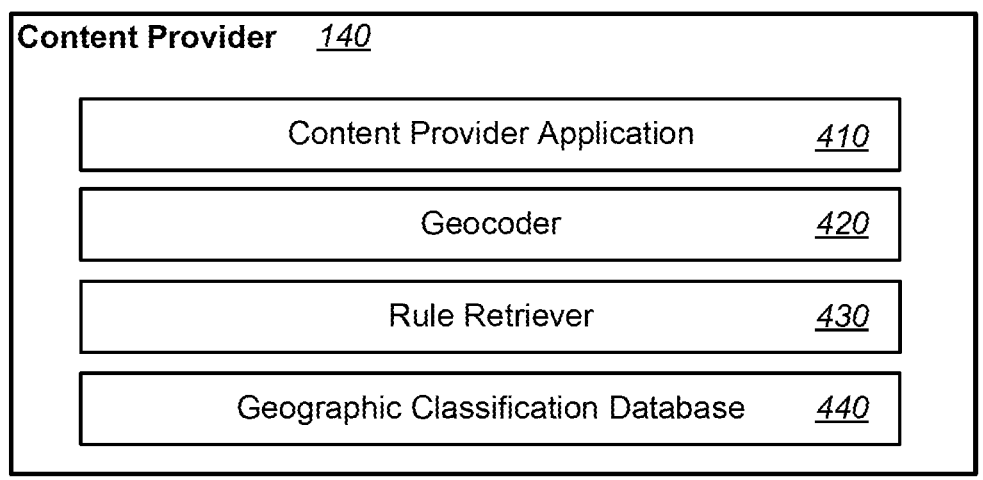
FIG. 4 is a schematic diagram of a content provider server, according to one illustrated implementation.

FIG. 4 illustrates an example content provider 140. Referring to FIG. 4, the content provider 140 includes a content provider application 410, a geocoder 420, a rule retriever 430 and a geographic classification database 440. The content provider application 410 executes plug-in applications 132 to provide a content, e.g., an image, video clip, audio clip, text, etc., to insert into one or more of the platform webpage or the landing webpage (if any) in response to the publisher request. The provided content is selected based on the operations of the geocoder 420 and the rule retriever 430.

The geocoder 420 obtains the geographic location information of the client 110 that sent the original request to the platform 120. Platform 120 has added the available data indicative of the geographic locations ("geodata") of the client 110. The geodata may directly reflect the geographic location information, or may be an identifier directing to a source of such geographic location information, e.g., a URL/URI. Further, some geodata may need to be processed to obtain the geographic location information. For example, the geodata may be an IP address of the client 110, and the geocoder 420 may need to translate the IP address into a geographic location. In some scenarios, the IP address of the client 110 may be the only data used to indicate the geographic location of the client 110. The IP address of the client 110 as originally contained in the HTTP request may be geocoded by the content provider 140 to determine the geographic location of the client 110.

The rule retriever 430 obtains the rules associated with each pertinent type of geographic location information. The rules may provide the customization of providing content based on the pertinent geographic location of the client 110. The rules may also provide the priority orders of applying the geographic location related rules in selecting the suitable content(s) in responding to the client 110 request. Rule retriever 430 may obtain the rules directly from the publisher request or may obtain the rule from a rule engine stored locally or remotely in the cloud resource 170 based on an identifier included in the publisher request. In an example, the publisher request may only provide a URI/URL to a rule as associated with a type of geographic location, and the rule retriever 430 maps the specific geographic location of the client 110 into the identified rule. Alternatively or additionally, the rules or rule engine may be communicated to the content provider 140 in an asynchronous manner and be stored locally with the content provider 140 for local retrieval or access.

In an example, for the rule related to each pertinent type of geographic location, the geographic classification database 440 is used. The geographic classification data in database 440 may be dynamically updated by publisher 130 and be saved through one or more locally with content provider 140 or remotely with cloud resource 170. Using the URI/URL in the publisher request, the rule retriever 430 may access the classification database 440, and maps the geographic location of the client 110 into the classification database 440 to determine the content to be used for the client 110. Specifically, if the geographic location of the client maps with a class in the geographic classification database 440, a content associated with the mapped geographic class will be selected to be provided to the client 110.

In an embodiment, in the case that no geographic class is mapped, a default content may be identified to be provided to the client 110. Based on the operation results of the geocoder 420 and the rule retriever 430, content provider application 410 selects a content customized for the client 110 to provide to the landing webpage of the publisher 130 and/or the platform webpage of the platform 120 as part of the plug-in applications 132 and/or 122. With the whole process of the exchange of HTTP request messages and response messages, the clients 110 accessing the same platform webpage and/or landing webpage will be provided with customized and often different contents, based on their different geographic locations.

Figure 5:
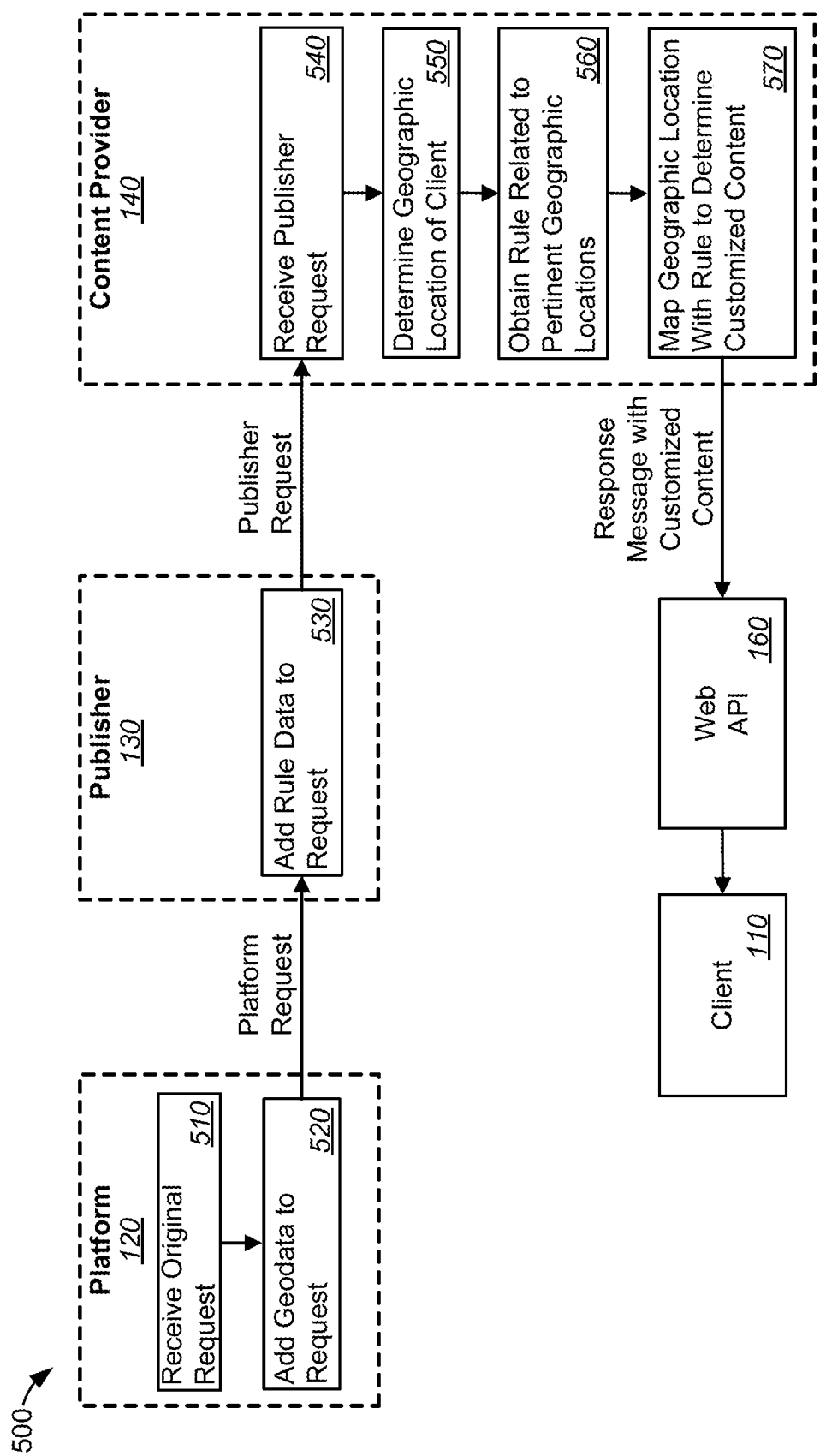
FIG. 5 is a flow diagram of a method of operation, according to one illustrated implementation.

FIG. 5 shows an example process 500. Referring to FIG. 5, in an example operation 510, the platform 120 receives an original request from a client 110. In an embodiment, the request is an HTTP request and includes a header portion and a content portion. For an illustrative example, a client 110 may launch a sports-related webpage of a platform website Example Platform.com, and click on a link to Super Bowl. The server of Example Platform.com as a platform receives such a request for the file.

In example operation 520, the platform message handler 230 of the platform 120 processes the client 110 request by adding data indicative of a geographic location of the client into one or more of the header portion or the content portion of the original request, and generates a platform request. The data indicative of the geographic location of the client may be information that directly reflects or relates to the geographic location of the client 110, or may be an identifier indicating a resource where the geographic information is stored. For example, the IP address of the client 110 may indicate that the client is in Seattle. Historical geographic location data of the client 110 detected by the system may indicate that the client 110 is from Boston. The generated platform request is received by the publisher 130, which is an advertiser for Super Bowl related commercials.

In example operation 530, the publisher message handler 330 processes the platform 120 request by adding data indicative of a rule associated with the geographic location of the client into one or more of the header portion or the content portion of the platform request, and generates a publisher request. The data indicative of the rule ("rule data") may be information that directly reflects or relates to the rule, or may be an identifier indicating a resource where the rule is stored. In an embodiment, a rule includes a geographic classification database that stores the classification of the related type of geographic locations. For example, the rule may classify the geographic locations of the United States based on the clusters of states or areas that support the Super Bowl teams. For example, Boston is classified as a New England Patriots supporter and Seattle is classified as a Seattle Seahawks supporter.

The rules may also include a mega rule which stipulates the priority in applying the rules associated with different types of geographic locations, including but not limited to historical geographic location data and residency geographic location data. For example, the mega rule may provide that for some commercials, e.g., those of advertised products directly related to the Super Bowl, e.g., helmets, the residency location of a client 110 has a priority over the current geographic location of the client 110, and for some other commercials, e.g., local sports bars in which to watch the Super Bowl, the current geographic location of the client 110 has priority over the residency location.

The publisher request is sent and received by the content provider 140.

In example operation 540, content provider application 410 of the content provider 140 receives the publisher request for a webpage content of a web address, which is either the platform webpage supported by platform 120 or the landing webpage supported by the publisher 130.

In example operation 550, the geocoder 420 of the content provider 140 determines the geographic location(s) of the client 110 based on the data in the publisher 130 request.

In example operation 560, rule retriever 430 obtains the rules related to the pertinent geographic location of the client 110.

In example operation 570, content provider application 410 maps the geographic locations with the geographic classification database of the rule, which associates geographic classes with contents, to obtain a customized content for the original request of the client 110.

If the geographic location of the client 110 maps with a geographic class in the classification database, content provider application 410 provides the associated content as a response message to the related web API. Specifically, in an embodiment, the content data will be provided as a plug-in to the web APIs that are linked to the URLs of the platform webpage or the landing webpage. Following the illustrative example, clicking on the Super Bowl link in the same platform webpage, the client 110 who is currently in Seattle and is from Boston will see a webpage including commercials of New England Patriots helmets and a list of sports bars in Seattle, while another client 110 who is currently in Boston and is from Seattle will see a webpage including commercials of Seattle Seahawks helmets and a list of sports bars in Boston.

In another example, the IP address of a client 110 is used to determine the geographic location of the client 110. The original HTTP request is passed to the content provider 140 through platform 120 and publisher 130, if any, with the IP address of the client 110 contained in the request. Content provider 140 geocodes the IP address to obtain the geographic location of the client 110 and maps the geographic location with a local or remote rule engine to determine a customized content for the client 110. The customized content is presented to the client 110 using a same URL, although different contents are presented to different clients 110. Following the Super Bowl example, a client 110 in Seattle may load an image in its browser named "superbowl.jpg" and receives a marketing image specifically catered to (customized) Seattle Seahawk fans. Another user in Boston loads the same "superbowl.jpg" and receives a different marketing image specifically catered to New England Patriots fans. Other users may receive a default marketing image if they are located in a region for which a specific image is not specified.

Advantageously, the same URL is used to present the "superbowl.jpg" file. The URL may be presented to the client 110 directly or may be a plug-in to a platform webpage by platform 120 and/or a landing webpage by publisher 130. A URL masked as an internet hosted file is a dynamic API endpoint supported by the content provider 140.

By using web APIs in presenting the webpage to the requester, the disclosed techniques achieve that customized contents be provided to different requesters without unnecessary duplicated programming for each requester and/or for each content, and a same webpage address, e.g., URL, may be used to present the different contents to different requesters. The complexity of managing the multiple servers that support the webpages is substantially reduced. Further, in the process of providing customized contents, the client request is modified in a distributed computing architecture such that the processing load on the content provider is substantially reduced, which also improves response speed. Specifically, the geographic location data and the rule data are obtained and inserted into the request through different servers of the platform and the publisher in, namely, pre-processed, and the content provider can easily retrieve and process such pre-processed geographic location data and rule data in selecting the corresponding content in, namely, final processing. Such distributed computing architecture and the allocation of the computing loads among the pre-processing and final processing are advantageous, especially in the nowadays common scenarios that a platform functions with multiple publishers, a publisher functions with multiple platforms, and a content provider functions with multiple platforms and publishers.

The data indicative of geographic location of a requester and the data indicative of rules associated with each type of geographic locations is added into the HTTP request message, either in the header portion or the content portion. Such modification of the HTTP messages take advantages of the existing channels of message exchange and reduces the computing complexity in processing the additional geographic location information and the additional rule information. Therefore, the operation of the computer system itself is streamlined and improved.

Figure 6:
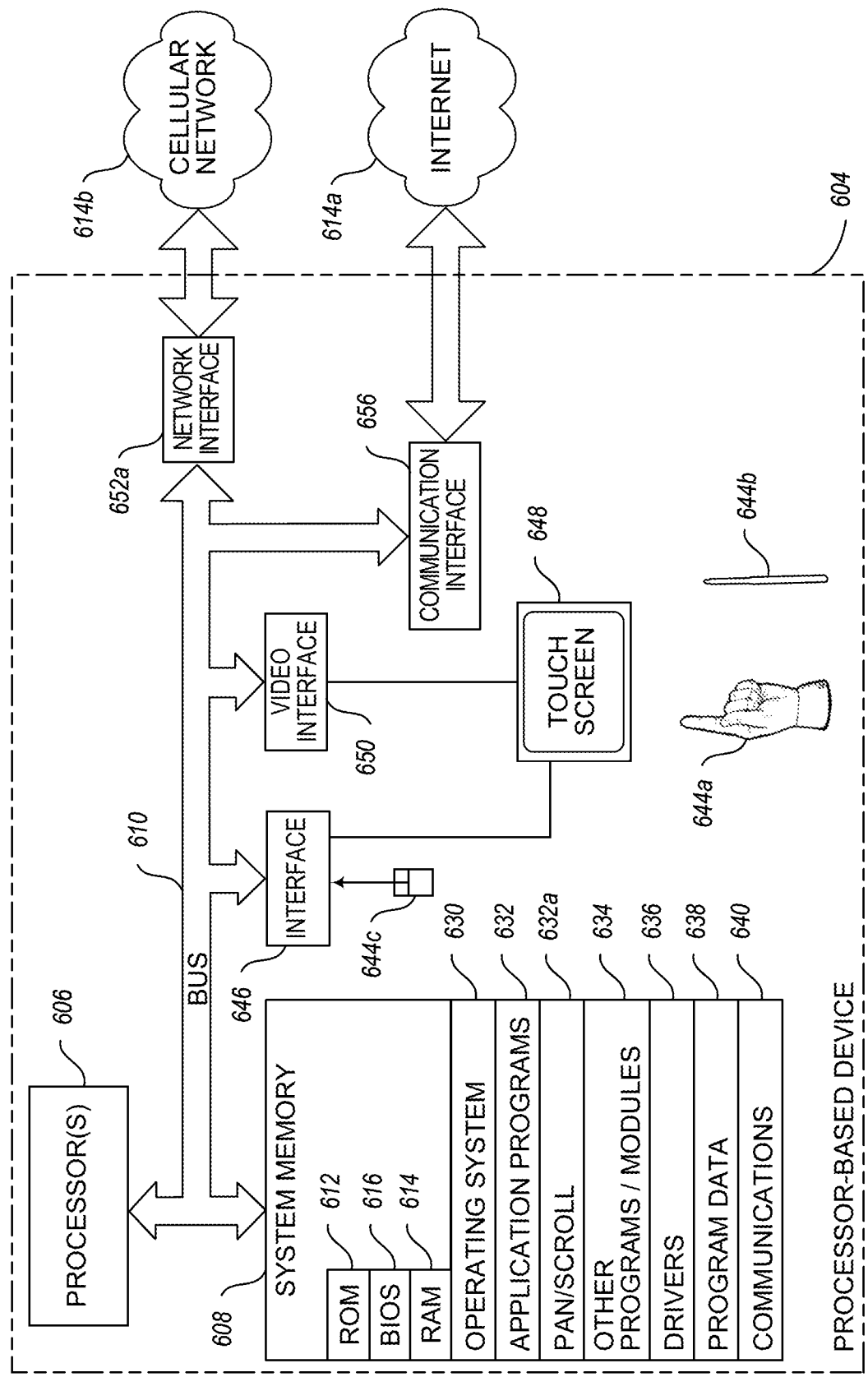
FIG. 6 is a block diagram of an example computing system suitable for executing one or more of the platform server, publisher server and the content provider server of FIGS. 2, 3 and 4, respectively.

FIG. 6 shows a processor-based device 604 suitable for implementing various embodiments described herein. For example, the processor-based device 604 may be representative of the computing systems of client 110, platform 120, publisher 130 and/or content provider 140 of FIG. 1. Although not required, some portion of the embodiments will be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smart-phones and tablet computers, wearable devices, multiprocessor systems, microprocessor-based or programmable consumer electronics, personal computers ("PCs"), network PCs, minicomputers, mainframe computers, and the like.

The processor-based device 604 may, for example, take the form of a smartphone or tablet computer, which includes one or more processors 606, a system memory 608 and a system bus 610 that couples various system components including the system memory 608 to the processor(s) 606. The processor-based device 604 will at times be referred to in the singular herein, but this is not intended to limit the embodiments to a single system, since in certain embodiments, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 606 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within processor-based device 604, such as during start-up. Some embodiments may employ separate buses for data, instructions and power.

The processor-based device 604 may also include one or more solid state memories, for instance Flash memory or solid state drive (SSD) 618, which provides nonvolatile storage of computer-readable instructions, data structures, program modules and other data for the processor-based device 604. Although not depicted, the processor-based device 604 can employ other nontransitory computer- or processor-readable media, for example a hard disk drive, an optical disk drive, or memory card media drive.

Program modules can be stored in the system memory 608, such as an operating system 630, one or more application programs 632, other programs or modules 634, drivers 636 and program data 638.

The application programs 632 may, for example, include panning/scrolling 632a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 632a may, for example, be stored as one or more executable instructions. The panning/scrolling logic 632a may include processor and/or machine executable logic or instructions to generate user interface objects using data that characterizes movement of a pointer, for example data from a touch-sensitive display or from a computer mouse or trackball, or other user interface device.

The system memory 608 may also include communications programs 640, for example a server and/or a Web client or browser for permitting the processor-based device 604 to access and exchange data with other systems such as user computing systems, Web sites on the Internet, corporate intranets, or other networks as described below. The communications program 640 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 6 as being stored in the system memory 608, the operating system 630, application programs 632, other programs/modules 634, drivers 636, program data 638 and server and/or browser 640 can be stored on any other of a large variety of nontransitory processor-readable media (e.g., hard disk drive, optical disk drive, SSD and/or flash memory).

A user can enter commands and information via a pointer, for example through input devices such as a touch screen 648 via a finger 644a, stylus 644b, or via a computer mouse or trackball 644c which controls a cursor. Other input devices can include a microphone, joystick, game pad, tablet, scanner, biometric scanning device, etc. These and other input devices (i.e., "I/O devices") are connected to the processor(s) 606 through an interface 646 such as a touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648.

Although not shown, the processor-based device 604 can include other output devices, such as speakers, vibrator, haptic actuator or haptic engine, etc.

The processor-based device 604 operates in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 604 may include one or more network, wired or wireless communications interfaces 652a, 656 (e.g., network interface controllers, cellular radios, WI-FI radios, Bluetooth radios) for establishing communications over the network, for instance the Internet 614a or cellular network.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652a, 656 are illustrated as communicably coupled to each other via the system bus 610, thereby providing connectivity between the above-described components. In alternative embodiments of the processor-based device 604, the above-described components may be communicably coupled in a different manner than illustrated in FIG. 6. For example, one or more of the above-described components may be directly coupled to other components, or may be coupled to each other, via intermediary components (not shown). In some embodiments, system bus 610 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally, regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

Accordingly, the claims are not limited by the disclosure.

The invention claimed is:

1. A system, comprising:
a first computing system including at least one first nontransitory processor-readable storage medium that stores at least one of processor-readable instructions or data and at least one first processor communicatively coupled to the at least one first nontransitory processor-readable storage medium, in operation the at least one first processor:

receives, from a client computing device, a client request for information;

detects a data indicative of a geographic location of the client computing device, the data indicative of a geographic location including current location data and past location data; and generates a modified request for the information by adding the data indicative of the geographic location for the client into the client request;

generates a platform request for a webpage; and a second computing system including at least one second nontransitory processor-readable storage medium that stores at least one of processor-readable instructions or data and at processor-readable storage medium, in operation the at least one second processor:

receives, ultimately from the first computing system, the modified request;

determines the current geographic location of the client computing device based on the data indicative of the geographic location for the client and determines the historical geographic location for the client based on the data indicative of the geographic location of the client;

identifies a rule related to the geographic location and the historical geographic location, the rule including a plurality of geographic location classes each corresponding to a content;

maps the current geographic location and the historical geographic location with the plurality of geographic location classes of the rule;

determines that the current geographic location and the historical geographical location maps into a geographic location class of the plurality of geographic location classes;

provides an identical URL to all client computing devices for each client request for information, the identical URL having a webpage having standard user content; and provides specific user content on the webpage to the identical URL through an application programming interface (API) endpoint, the content associated with the mapped geographic location class to the client computing device.

2. The system of claim 1, further comprising a third computing system, the third computing system processing the modified request by adding data indicative of the rule related to the geographic location.

3. The system of claim 2, wherein the data indicative of the rule identifies a cloud based rule engine for the second computing system to identify the rule.

4. The system of claim 1, wherein the data indicative of the geographic location comprises location data selected from the group consisting of current residency, current geographic location, past residency, hometown, and college locations.

5. The system of claim 1, wherein the data indicative of the geographic location of the client computing device includes an internet protocol address of the client computing device.

6. A method of operating a processor-based system to provide individualized client content without the use of duplicative programming for each client, the method comprising:

on a processor-based system:

receiving, ultimately from a requester computing device, by at least one processor, an HTTP request containing one or more data indicative of a geographic location of the requester and historical geographic location of the requester;

determining the geographic location of the requester and historical geographic location of the requester based on the data indicative of the geographic location and historical geographic location;

determining a content based on the geographic location and historical geographic location by mapping the geographic location of the requester and historical geographic location of the requester with a rule; and providing an identical URL to each requester computing device having content standard for all requesters;

providing the content based on the geographic location and historical geographic location of the requester to the requester computing device through an application programming interface linked to said the identical URL.

7. The method of claim 6, wherein the data indicative of the geographic location indicates a plurality of geographic locations associated with the requester computing device and the processor-based system determines a pertinent geographic location of the requester among the plurality of geographical locations by applying the rule.

8. The method of claim 7, wherein the processor-based system determines a priority order of a set of pertinent geographical locations.

9. The method of claim 8, further comprising changing the priority order of the geographic location of the requester and the historical geographic location of the requester set of pertinent geographic locations.

10. The method of claim 9, wherein the changing priority order of the geographic location of the requester and the historical geographic location of the requester set of pertinent geographic locations is based on a detected interaction to the provided content on the requester computing device.

11. A method of operating a processor-based system to provide individualized client content without the use of duplicative programming for each client, the method comprising:

receiving, by an at least one processor of the processor-based system, and from a processor-based platform system, a request for a web page content from a client computing device, the request including data indicative of a geographic location of a client and data indicative of a historical geographic location;

determining the geographic location of the client computing device and determining the historical geographic location of the client based on the data;

mapping the geographic location of the client and the historical geographic location of the client with a dynamically updatable geographic classification database that associates geographic classes with contents;

determining that the geographic location of the client computing device and the historical geographic location of the client maps into a geographic class in the geographic classification database;

provides an identical URL to all client computing devices for each client request for web page content from a client computing device, the identical URL having a webpage having standard client content; and providing a specific client content that is associated with the determined geographic class in the geographic classification database to an application programming interface (API) linked to the identical URL.

12. The method of claim 11, wherein the determining that the geographic location of the client and the historical geographic location of the client maps into the geographic class in the geographic classification database includes applying a rule of a rule engine.

13. The method of claim 12, where the applying the rule of the rule engine includes applying a rule of a cloud-based rule engine.

14. The method of claim 11, wherein the data indicative of the geographic location of the client computing devices includes an internet protocol (IP) address of the client computing device.

15. The method of claim 11, wherein the data indicative of the geographic location of the client computing device includes one or more of GPS or mobile signal strength information.

16. The method of claim 11, wherein the determining the geographic location of the client based on the data includes determining the geographic location of the client computing device based on the data using a cloud-based geocoding system.

17. The method of claim 11, wherein the data indicative of the geographic location of the client includes a plurality of data indicating a plurality of types of geographical locations associated with the client computing device and the determining the geographic location of the client includes determining the plurality of types of geographical locations.

18. The method of claim 17, wherein the determining the geographic location of the client includes determining a pertinent geographic location of the client among the plurality of types of geographical locations by applying a rule.

19. The method of claim 18, wherein the determining the geographic location of the client and the historical geographic location of the client includes determining a priority order of a set of pertinent geographical locations.

20. The method of claim 19, wherein the determining the geographic location of the client and the historical geographic location of the client includes:
receiving a user interaction to the provided content; and
adjusting the priority order of the geographic location of the client and the historical geographic location of the client based on the received user interaction.

* * * * *